United States Patent [19]
Banker

[11] 3,963,941

[45] June 15, 1976

[54] AUTOMATIC LIGHT SWITCH AND BATTERY DISCONNECT

[76] Inventor: Oscar H. Banker, 261 Breezewood Drive, Bay Village, Ohio 44140

[22] Filed: Apr. 16, 1975

[21] Appl. No.: 568,693

[52] U.S. Cl. .................. 307/10 BP; 317/142 TD; 315/82
[51] Int. Cl.² ........................................ H01H 47/18
[58] Field of Search .......... 307/10 BP, 10 LS, 10 R; 315/82, 83; 317/142 TD, 123, 141 R

[56] References Cited
UNITED STATES PATENTS
3,433,969   3/1969   Krenke ........................... 307/10 BP

*Primary Examiner*—Herman Hohauser
*Attorney, Agent, or Firm*—Charles F. Voytech

[57] ABSTRACT

Disclosed is a circuit for automatically turning off the lights of a vehicle after the ignition switch is turned off. A delay in the turning off of the lights is produced with the aid of a thermally responsive switch in series with the light switch. The light switch is initially in series with the ignition switch through the thermally responsive switch. The heat source of the thermally responsive switch is shut off with the ignition so that when the ignition switch is turned off, the heat source is deenergized and the bimetallic switch controlled thereby changes its shape to disconnect the light switch from the car battery. The heat source may be an electric heating element, or it may be some part of the vehicle power plant such as the exhaust pipe.

9 Claims, 3 Drawing Figures

AUTOMATIC LIGHT SWITCH AND BATTERY DISCONNECT

This invention relates to an automatic shut-off circuit for the lights of a vehicle which becomes effective after the ignition switch for that vehicle is turned off.

The desirability of an automatic shut-off for vehicle lights after the vehicle has been parked has been appreciated for some time. It has been also found desirable to delay the automatic shut-off of vehicle lights for approximately one-half minute so that a driver arriving at night in an unlit garage may have the benefit of his vehicle lights to light the garage interior until he can get to a light switch in or adjacent to the garage.

An automatic shut-off for vehicle lights having the foregoing characteristics is disclosed in U.S. Pat. No. 2,806,980 to I. D. Shapiro, granted Sept. 17, 1957. The device there shown uses a thermally responsive switch permanently in series with the battery and light switch, with a relay operated switch interposed between the thermal and light switches. The relay is energized by the ignition switch so that when the ignition is on, the circuit through the thermal switch is broken, but a separate circuit is established to the light switch from the ignition switch. Furthermore, since in its relaxed position the relay connects the light switch to the battery through the thermal element of the thermal switch independently of the ignition switch so that the thermal switch would continuously alternate between "on" and "off", a latch and reset button are necessary on the thermal switch to latch the switch in its "off" position.

The simplification of prior automatic light switch cut-off circuits is among the principal objects of this invention.

It is also an object of this invention to provide a fail-safe light switch cut-off circuit so that should the thermal element fail at night while the vehicle is travelling at high speed, the lights will continue to be effective. This feature is lacking in the Shapiro cut-off disclosed above.

A more specific object of this invention is to provide a cut-off circuit for vehicle lights which may be readily and inexpensively installed in vehicles after they leave the factory.

In the vehicle light cut-off circuit of this invention, it is required to add to existing circuitry in a vehicle only a thermally responsive relay and such wires as are necessary to make three connections with the switch elements of the relay. The switch element is a single pole, double throw switch, the pole or switch arm of which is designed to connect the light switch for the vehicle lights either to the accessory side of the vehicle ignition switch or to the battery, depending upon the condition of the heating element of the thermally responsive relay. The heating element if electrically energized, is connected to the accessory side of the ignition switch so that it is energized whenever the ignition or the accessories of the vehicle are turned on.

The thermally responsive relay can be mounted on any part of the body convenient to the light switch and the ignition switch. Since both of these switches are on or near the vehicle dash, the thermally responsive relay can be most conveniently mounted on the vehicle dash.

These and other objects of this invention will become apparent from a detailed description of a preferred embodiment of the invention when taken together with the accompanying drawings which form a part thereof and in which.

Figure 1:
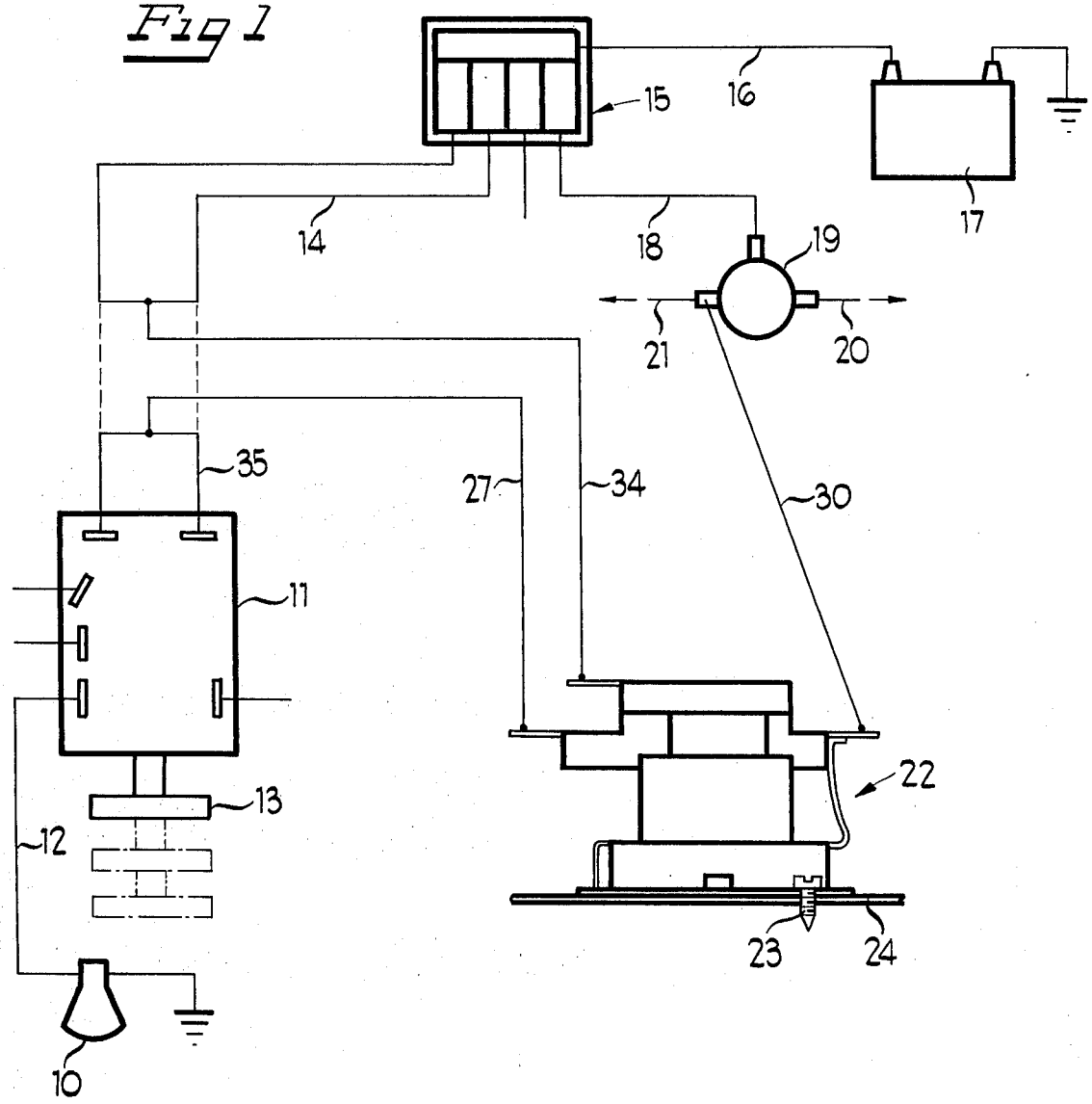
FIG. 1 is a schematic wiring diagram of a vehicle light circuit incorporating the automatic light shut-off of this invention.

Referring now to FIG. 1, a headlight of a vehicle is shown schematically at 10 connected to a light switch shown generally at 11 by a wire 12. It is understood that two or more such lights will be connected in parallel. Said light switch 11 has a control button 13 capable of being extended out of or pushed into the body of the light switch to make or break successively a plurality of contacts controlling the vehicle lights.

Light switch 11 has one or more input wires 14 which may emanate from a fuse box 15 having an input wire 16 connected to a source of current such as a battery 17. It is understood that the usual generator or other engine-driven source of electric current (not shown) will also be connected to input wire 16 so that during normal operation of the vehicle and its engine, the current for operating the lights and the control therefor of this engine as well as for charging battery 17, will be produced by the generator rather than by battery 17.

From fuse box 15 a wire 18 connects input wire 16 to an ignition switch 19 which has one position 20 in which wire 18 is connected to the ignition circuit for the vehicle and to the accessories, and another position 21 in which wire 18 is connected only to the accessories. it has, of course, the usual "off" position in which the connection to wire 18 is broken.

The thermally responsive switch is shown at 22 and it is secured by one or more screws 23 to the metal frame of the vehicle which may be the dash 24 of the vehicle. Said screw 23 may serve as the ground for thermally responsive switch 22.

Figure 2:
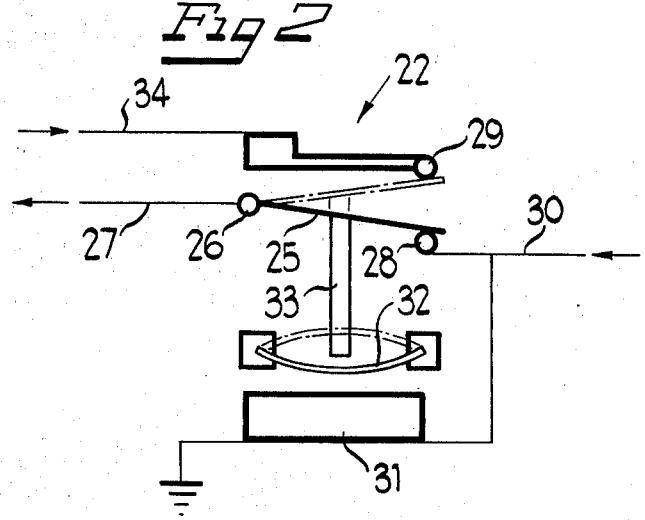
FIG. 2 is a schematic diagram of the thermally operated switch used in the diagram of FIG. 1.

The internal arrangement of the components of switch 22 may be as shown in FIG. 2. The switch is a single pole, double throw switch having an arm 25 pivoted at 26 to the frame of the switch and adapted to connect an input current wire 27 for switch 11 to contact 28 in the cold condition of switch 22, or to contact 29 in the hot condition of said switch 22. Contact 28 is connected by a wire 30 to the accessory current source at ignition switch 20. Said wire 30 is also connected to one side of a heater element 31 of switch 22, the other side of said heater element being connected to ground. A heat responsive bimetallic element 32 is connected by a strut 33 to switch arm 27 to move said arm in accordance with the movement of said bimetallic element. Wire 14 from fuse box 15 is connected by a wire 34 to contact 29.

Thus, thermally responsive switch 22 connects the input 35 of light switch 11 either to the input current to the accessories of the vehicle or to the fuse box thereof. When ignition switch 20 is turned either to the ignition side or to the accessory side thereof current from either battery 17 or from a current generator driven by the vehicle engine will be passed through contact 28 and arm 25 to light switch 11 making it possible to turn on the lights whenever the ignition switch is on one of its two operating settings.

In either of these two settings heating element 31 is energized and within the designed time for the bimetallic element, the latter will change its shape and will cause the bimetallic element to operate strut 33 to move switch arm 25 from contact 28 to contact 29. This connects light switch 11 to the battery 17, and said light switch is then operated in the normal way. As long as the ignition switch is in either normal ignition or in accessory position, heater element 31 will be energized and switch arm 25 will be connected to contact 29. Any current drain caused by heater element 31 will be made up by the vehicle generator except when the vehicle engine is not running and the ignition switch is in accessory positon. In the latter event, battery 17 supplies heating element 31 with current.

When the ignition switch is in its "off" position, i.e., it is not conditioned to supply current either to the vehicle engine ignition circuit or the accessory circuit, current to the heating element 31 is turned off and said element cools off until bimetallic element returns to its "cold" condition in which switch arm 25 is disconnected from contact 29 and is connected to contact 28. The latter contact under these conditions is disconnected from any current source and, hence, light switch 11 and lights 10 are deenergized.

The length of time required by heating element 31 to cool down to its relaxed condition in which it is connected to contact 28 depends upon the objectives of the designer. If the objective is to provide light in a garage for a period after the vehicle engine is shut off sufficient to allow the driver to leave the garage, thirty seconds to a minute may be sufficient. Longer delays may be designed into switch 22.

Figure 3:
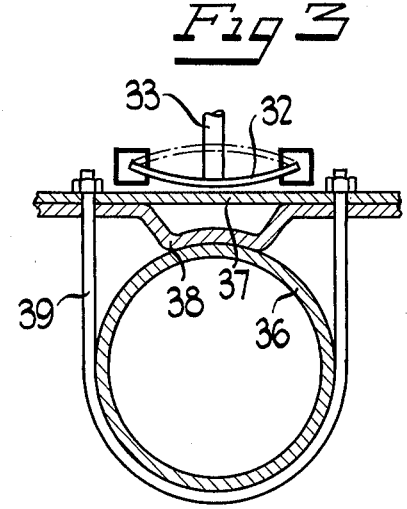
FIG. 3 is a schematic diagram of a second heat source for the thermally responsive switch.

Instead of an electrically heated element such as 31 to heat bimetallic element 32, other heat sources on a vehicle can be used provided they begin to cool just as soon as the engine is shut off. One such other heat source is the exhaust pipe for the engine and it is shown in FIG. 3. In that figure the exhaust pipe is shown at 36 and to it is secured a mounting plate 37 for the thermally responsive bimetallic element 32. The means by which the element is mounted on plate 37 is not shown, such being readily devised by those skilled in the art.

Plate 37 is held in spaced relation to exhaust gas pipe 36 by a metallic spacer 38 disposed between plate 37 and pipe 36. A U-bolt 39 passes around pipe 36 and through plate 37 to clamp pipe 36 and spacer 38 to plate 37. The degree of spacing provided by spacer 38 will depend upon the normal temperature of the exhaust which may be higher than that of a resistance type electric heater usually supplied with thermally responsive switches.

The switch of FIG. 3 will provide a delay in the cutting off of the vehicle lights 10 of a duration which may be less predictable than the delay produced by an electrically heated switch since the exhaust pipe is exposed to the elements and hence is subject to changes in the location of the vehicle. Thus, if the vehicle passes from a heated area in winter to an outdoor parking lot the delay may be of shorter duration in the outdoor parking lot.

I claim:

1. In a vehicle having lights, a control switch for the lights, a source of electric current, an ignition circuit for an internal combustion engine and an ignition switch in the ignition circuit having "on" and "off" positions, said ignition switch in its "on" position energizing both the ignition and accessories circuits, a thermally responsive relay switch having a heating element and a single pole, double throw switch responsive to the temperature of said heating element, the pole of said last-mentioned switch being connected at one end to the control switch for the lights, one contact of the double throw switch being connected to the accessories circuit and the other contact of said double throw switch being connected to the source of electric current, whereby upon setting the ignition switch in its "on" position, the source of electric current is connected to the light control switch through the accessories circuit and thereafter the source of electric current to the light switch is dependent only upon the thermally responsive relay switch for supplying current to the light control switch.

2. The combination defined in claim 1, said heating element being connected to a source of energy which is rendered effective in timed relation to the energization of the ignition.

3. The combination defined in claim 2, said source of energy being the source of electric current.

4. The combination defined in claim 2, said source of energy being an exhaust pipe for an internal combustion engine in said vehicle.

5. The combination defined in claim 1, including further a fuse box having an input connected to the source of current and a plurality of output circuits adapted to be connected to the lights through the control switch for the lights, a common lead connecting the output circuits adapted to be connected to the lights, said common lead being connected to the said other contact of said double throw switch, and another common lead connecting the input to the control switch for the lights to the said pole of said last-mentioned switch.

6. The combination defined in claim 5, said thermally responsive relay switch being disposed in proximity to the fuse box.

7. The combination defined in claim 1, said heating element comprising an electrical resistance unit having one side connected to the accessories circuit and the other side connected to ground such that said heating element is deenergized when the ignition switch is in its "off" position.

8. The combination defined in claim 1, said heating element comprising a section of an exhaust gas system for a vehicle engine, and means mounting the thermally responsive relay on the said section of an exhaust gas system.

9. The combination defined in claim 8, said heating element comprising a section of an exhaust gas pipe for the vehicle engine, and said means mounting the thermally responsive relay on the said section of an exhaust gas pipe comprising a base plate on the said relay, a spacer between the said section of an exhaust gas pipe and the base plate for holding the base plate a fixed distance from the said section of an exhaust gas pipe and means clamping the base plate, spacer and gas pipe together.

* * * * *